United States Patent [19]

Kozu

[11] Patent Number: 5,663,687

[45] Date of Patent: Sep. 2, 1997

[54] LSI WITH BUILT-IN CLOCK GENERATOR-CONTROLLER FOR OPERATION WITH LOW POWER DISSIPATION

[75] Inventor: Shinichi Kozu, Tokyo, Japan

[73] Assignee: NEC Corporation, Japan

[21] Appl. No.: 532,962

[22] Filed: Sep. 25, 1995

[30] Foreign Application Priority Data

Sep. 26, 1994 [JP] Japan ..................... 6-229307

[51] Int. Cl.$^6$ ............................. G06F 1/04; G06F 1/32
[52] U.S. Cl. ................ 331/14; 395/551; 395/559; 395/750.01; 327/156; 327/159; 327/161; 365/227; 364/707; 331/25; 331/1 A
[58] Field of Search ............ 331/14, 25, 1 A; 327/156, 158, 159, 161; 395/750, 551, 552, 559; 365/226, 227; 364/707

[56] References Cited

U.S. PATENT DOCUMENTS 5,376,848  12/1994  Hanke, III et al. ................ 327/141

FOREIGN PATENT DOCUMENTS 4-25913  1/1992  Japan .
85/02275  5/1985  WIPO .

*Primary Examiner*—Robert Pascal
*Assistant Examiner*—Arnold Kinkead
*Attorney, Agent, or Firm*—Ostrolenk, Faber, Gerb & Soffen, LLP

[57] ABSTRACT

The invention provides an LSI with a built-in clock generator-controller which minimizes power dissipation of an entire system and reduces production of a skew between an external system clock signal and an internal clock signal. The clock generator-controller includes a phase locked loop circuit formed from an input side divider for dividing an internal clock signal in response to a dividing signal, a phase comparator for comparing the phases of the clock signal divided by the divider and an external system clock signal with each other, a low-pass filter for converting a result of the comparison of the phase comparator into an analog voltage, a voltage controlled oscillator for outputting an oscillation signal having an oscillation frequency which is varied in response to the output signal of the low-pass filter, an output side divider for dividing the oscillation signal produced by the voltage controlled oscillator to produce an oscillation signal of a low frequency, a delay circuit for delaying the oscillation signal produced by the voltage controlled oscillator by a delay time equal to that of the oscillation signal divided by the output side divider, and a selector for selectively outputting, as the internal clock signal to be fed back to the input side divider, one of the low frequency oscillation signal divided by the output side divider and the oscillation signal delayed by the delay circuit in response to an operation condition signal.

4 Claims, 5 Drawing Sheets

LSI WITH BUILT-IN CLOCK GENERATOR-CONTROLLER FOR OPERATION WITH LOW POWER DISSIPATION

BACKGROUND OF THE INVENTION

1. Field of the Invention

This invention relates to a large scale integrated circuit (LSI), and more particularly to an LSI with a built-in clock generator-controller for an operation with low power dissipation.

2. Description of the Related Art

A conventional LSI of the type mentioned will be described with reference to the drawings.

FIG. 4 show in block diagram a construction of a clock controller for such a conventional microprocessor which operates with low power dissipation as disclosed in Japanese Patent Publication Application No. Heisei 4-12842. Referring to FIG. 4, the clock controller shown includes a phase locked loop circuit PLL formed from a phase detector 406, a low-pass filter 407, a voltage controlled oscillator 409 and a modulo divider 405, and a timing selector 411.

In the clock controller shown in FIG. 4, an oscillation output of an external quartz oscillator (not shown) is applied to the phase detector 406 by way of an external oscillation signal input terminal 401 and also to the timing selector 411 for achieving a low power dissipation operation. An output terminal of the phase detector 406 is connected to the low-pass filter 407 which passes only signals of a low frequency band, and an analog output terminal of the low-pass filter 407 is connected to the voltage controlled oscillator 409.

An on/off control signal 404 is inputted to a second input terminal 408 of the low-pass filter 407 and a second input terminal 410 of the voltage controlled oscillator 409. An output of the voltage controlled oscillator 409 is supplied to input terminals of the modulo divider 405 and the timing selector 411. An output of the modulo divider 405 is inputted to the other input terminal of the phase detector 406. A modulo control signal 402 is inputted to the modulo divider 405 and determines a dividing ratio. Further, a clock selector control signal 403 is inputted to the timing selector 411.

The phase locked loop circuit PLL functions based on an operation principle of a frequency phase locked loop and synchronizes the phase and the frequency of the output signal of the voltage controlled oscillator 409 with the phase and the frequency of an input signal thereto. More particularly, the phase locked loop circuit PLL synchronizes the phase and the frequency of the output signal of the voltage controlled oscillator 409 with the phase and the frequency of an external oscillation signal applied to the external oscillation signal input terminal 401. The output signal frequency fsyn of the voltage controlled oscillator is related to the external oscillation signal frequency fref in accordance with the following equation:

$$fsyn = M \times fref$$

where M is a dividing coefficient of the modulo divider 405.

More particularly, the phase detector 406 compares the phase of the external oscillation signal (frequency: fref) with the phase of the output signal (frequency: fsyn/M) of the modulo divider 405 and produces an output signal which increases in proportion to a difference between the phases of the two signals. The output signal is applied to the input terminal of the low-pass filter 407. The low-pass filter 407 shapes the output signal of the phase detector 406, and an output signal of the low-pass filter 407 is applied to the frequency control input terminal of the voltage controlled oscillator 409. The voltage controlled oscillator 409 generates a signal having a frequency directly related to the value of a voltage VIN applied to the frequency control input terminal as given by the following equation:

$$fsyn = K \times VIN$$

where K is a constant which depends upon a particular circuit parameter.

The output signal of the voltage controlled oscillator 409 is supplied to the modulo divider 405 which divides the frequency of an input signal thereto by the dividing coefficient M. The dividing coefficient M is determined by the modulo control signal 402. The output signal of the voltage controlled oscillator 409 is supplied also to the timing selector 411 which divides the frequency of the input signal thereto by another dividing coefficient N. The timing selector 411 divides the output signal of the voltage controlled oscillator 409 in accordance with the dividing ratio N designated by the clock selector control signal 403 and generates a clock signal for the microprocessor. The relationship between the power dissipation Pslow of the microprocessor when it operates with a clock signal of a low frequency and the power dissipation Pnormal of the microprocessor when it operates with a clock signal which has not been divided is given by the following equation:

$$Pnormal = N \times Pslow$$

where N is a dividing ratio of the timing selector 411.

FIG. 5 shows in block diagram a construction of such a conventional clock outputting circuit as disclosed in Japanese Patent Laid-Open Application No. Heisei 4-25913.

Referring to FIG. 5, the clock outputting circuit shown has a buffer circuit 502 having an input terminal to which a clock input terminal 501 is connected and an output terminal connected to an external clock output terminal 503, and another buffer circuit 504 having an input terminal connected to the output of the buffer circuit 502 and an output terminal connected to an internal clock output terminal 505. The buffer circuits 502 and 504 are each formed from an IC and are mounted on a common circuit board.

In the circuit shown in FIG. 5, when the load capacity to the external clock output terminal 503 varies so that the delay time of the clock signal outputted from the external clock output terminal 503 with respect to the input signal to the clock input terminal 501 is varied, also the delay time of the clock signal outputted from the internal clock output terminal 505 is varied by an equal amount. Accordingly, the time difference between the clock signal outputted from the external clock output terminal 503 and the clock signal outputted from the internal clock output terminal 505 is always kept fixed. In short, the time difference (skew) can be suppressed substantially to zero.

In a system to which an LSI is applied, the entire system formed from the LSI operates with a clock signal supplied from a fixed frequency clock generator included in the system. While this configuration simplifies the circuit configuration of the system formed from the LSI, it limits, from the point of view of power dissipation, the performance demanded for the system.

When the calculation processing capacity varies with respect to time, the frequency of the system clock signal is set sufficiently high in order to supply a calculation processing capacity necessary to process a maximum processing amount to be executed by the system. In such a case, the system operates with the flock signal of the high frequency even when it performs processing for which the maximum processing capacity is not required. A system formed from a CMOS LSI dissipates higher power upon operation thereof with a high frequency. Accordingly, a system which is controlled by a fixed frequency clock signal dissipates a greater amount of power comparing with another system which is controlled by a variable frequency clock signal whose clock frequency varies high or low depending upon whether the processing amount is great or small. Such variable frequency clock signal contributes very much to reduction of the power dissipation of the entire system formed from an LSI.

Subsequently, it will be examined to adapt the way of thinking of such a conventional clock controller as shown in FIG. 4 to an entire system formed from an LSI.

The object of a conventional microprocessor which can operate with low power dissipation is to provide a variable frequency clock generator for a microprocessor whose frequency is varied in accordance with a request for calculation of the microprocessor, to provide a clock generator and a microprocessor which provide reduced power power dissipation of the combination of a variable clock generator and a microprocessor, and to provide a variable frequency clock generator which can be formed readily on a common chip with a microprocessor for which various integrated circuit techniques including a CMOS technique are used.

While the construction of a microprocessor described above contributes to reduction in power dissipation of a clock generator and a microprocessor provided on a common silicon material, it has some problem when it is applied to achieve reduction of power dissipation of an entire system formed from an LSI. In particular, when a microprocessor performs a low power dissipation operation, or in other words, a low frequency operation, also the entire system which operates in synchronism with the microprocessor must perform a low frequency operation with a system clock signal divided by an equal dividing ratio N. In order to supply the system clock signal for a low frequency operation, the fixed frequency clock generator of the conventional arrangement must be replaced with a variable frequency clock generator which is controlled by the microprocessor, or a low frequency clock signal generated in the microprocessor must be supplied to the outside.

When an external variable frequency clock generator is controlled by a microprocessor, it is difficult to control smooth switching between clock signals. While an external circuit is provided to interconnect the external clock generator and the microprocessor, depending upon variations of parameters of the external circuit and external conditions such as an operation temperature, such a short pulse (spike) as may cause a malfunction if the clock signal of the external clock generator is used as a clock signal for the microprocessor is produced upon switching between clock signals. The spike gives rise to a problem that it makes the microprocessor malfunction or, in the worst case, stop its operation. One of possible solutions to prevent such a malfunction of the microprocessor by a spike as described above is to use an on/off control signal for a phase locked loop circuit to stop operation of the phase locked loop circuit to stop supply of the clock signal to the microprocessor. This method, however, is disadvantageous in that switching between clock signals cannot be performed smoothly because the microprocessor stops its operation for a certain period of time.

Where a clock signal for a low frequency operation generated in a microprocessor is supplied as an external system clock signal, it is difficult to control to establish synchronism between the external system clock signal and an internal clock signal of the microprocessor. When the clock signal generated in the microprocessor is supplied to the outside, the number of external terminals, or in other words, the load, connected to an external system clock supplying output terminal varies depending upon the scale/configuration of the system, and this varies the delay time of the external system clock signal itself. Consequently, a difference in delay time between the internal clock signal and the external system clock signal, that is, a skew, is produced. The skew gives rise to a problem when communications synchronized with clocks are performed between the inside and the outside of the microprocessor.

Even if the manner of thinking of the conventional arrangement shown in FIG. 5 is applied to the problem of production of a skew which occurs with the conventional example described hereinabove with reference to FIG. 4, it still is difficult to supply an external system clock signal to the entire external system only from the buffer circuit 502 provided in the CMOS LSI. Consequently, an external clock driver is connected to the external clock output terminal 503, and an output of the external clock driver is used as an actual external system clock signal. Therefore, it is impossible to solve the problem that a skew is produced between the external system clock signal and the internal clock signal.

SUMMARY OF THE INVENTION

It is an object of the present invention to provide an LSI with a built-in clock generator-controller which minimizes power dissipation of an entire system in which the LSI is incorporated.

It is another object of the present invention to provide an LSI with a built-in clock generator-controller which can prevent production of a skew between an external system clock signal and an internal clock signal.

In order to attain the objects described above, according to the present invention, there is provided an LSI with a built-in clock generator-controller, comprising a central processing unit for outputting an operation condition signal indicative of whether a current operation condition thereof is a low power dissipation operation or a normal operation, and a clock generator-controller for receiving the operation condition signal, an output of an external oscillator, an external system clock signal, and a dividing signal which designates a ratio between the external system clock signal and an internal clock signal, producing an internal clock signal in response to the operation condition indicated by the operation condition signal and supplying the internal clock signal to the central processing unit, the clock generator-controller including a first input terminal for receiving an oscillation signal generated by the external oscillator, a first divider for dividing the oscillation signal to produce an oscillation signal of a low frequency, first delay means for delaying the oscillation signal received from the outside by a delay time equal to that of the oscillation signal divided by the first divider, first switching means for selectively outputting one of the low frequency oscillation signal divided by the first divider and the oscillation signal delayed by the first delay means in response to the operation condition signal from the central processing unit, an output terminal for supplying the output of the first switching means as a basic signal for the external system clock signal, a second input terminal for receiving the external system clock signal, a third input terminal for receiving receiving the dividing signal, a second divider for dividing the internal clock signal in response to the dividing signal, a phase comparator for comparing phases of the clock signal divided by the second divider and the external system clock signal with each other, a low-pass filter for converting a result of the comparison of the phase comparator into an analog voltage, a voltage controlled oscillator for outputting an oscillation signal having an oscillation frequency which is varied in response to the output signal of the low-pass filter, a third divider for dividing the oscillation signal produced by the voltage controlled oscillator to produce an oscillation signal of a low frequency, second delay means for delaying the oscillation signal produced by the voltage controlled oscillator by a delay time equal to that of the oscillation signal divided by the third divider, and second switching means for selectively outputting, as the internal clock signal, one of the low frequency oscillation signal divided by the third divider and the oscillation signal delayed by the second delay means in response to the operation condition signal from the central processing unit, the internal clock signal outputted from the second switching means being fed back as an input clock signal to the second divider so that a phase locked loop circuit is formed from the second divider, the phase comparator, the low-pass filter, the voltage controlled oscillator, the third divider, the second delay means and the second switching means. Alternatively, the output of the voltage controlled oscillator may be fed back as an input clock signal to the second divider so that another phase locked loop circuit is formed from the second divider, the phase comparator, the low-pass filter and the voltage controlled oscillator except the third divider, the second delay means and the second switching means.

In the LSI, since the frequency phase locked loop circuit which synchronizes the phases of the frequency of the actual external system clock signal and the frequency of the internal clock signal is formed, the skew between the two signals can be reduced substantially to zero.

Thus, the LSI is advantageous in that a low frequency clock signal for a lower power dissipation operation can be supplied to the outside to suppress the power dissipation of an entire system formed from the LSI, that the skew between the internal clock signal and the external system clock signal which is generated by driving the low frequency clock signal supplied to the outside from the LSI by means of an external circuit can be suppressed, that switching between a normal clock signal and a low frequency clock signal can be performed smoothly suppressing production of a spike, and that a low frequency clock signal for a low power dissipation operation can be generated to suppress the power dissipation of the LSI itself. Where the phase locked loop circuit is formed only from the second divider, the phase comparator, the low-pass filter and the voltage controlled oscillator, the LSI can cope with an internal clock signal of a higher speed.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
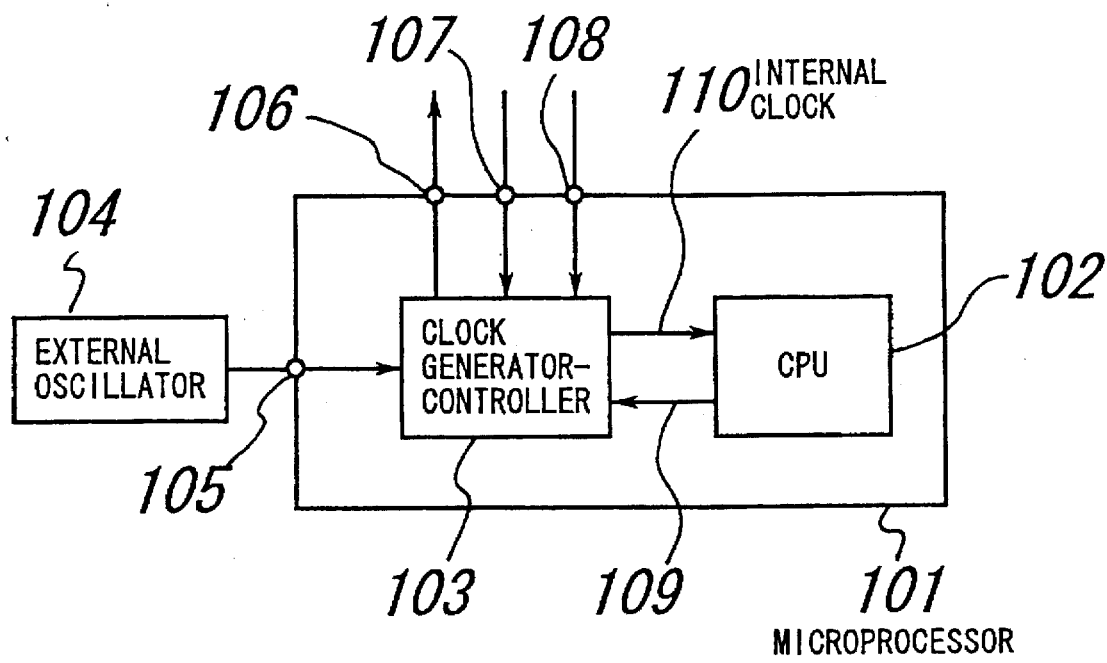
FIG. 1 is a block diagram showing a basic construction of a microprocessor with a built-in clock generator-controller to which the present invention is applied.

Referring first to FIG. 1, there is shown in block diagram a basic construction of a microprocessor with a built-in clock generator-controller to which the present invention is applied. The microprocessor is generally denoted at 101 and includes a central processing unit 102, a clock generator-controller 103, an external oscillation signal input terminal 105 for receiving, as an input signal thereto, an oscillation signal from an external oscillator 104 which includes a quartz oscillator, a signal output terminal 106 for an external system clock signal, an external system input terminal 107, and an input terminal 108 for receiving, as an input signal thereto, a signal for determining a frequency ratio between an external system clock signal and an internal clock signal. A signal which designates a low power dissipation operation is supplied from the central processing unit 102 to the clock generator-controller 103, and an internal clock signal 110 is supplied from the clock generator-controller 103 to the central processing unit 102.

Figure 2:
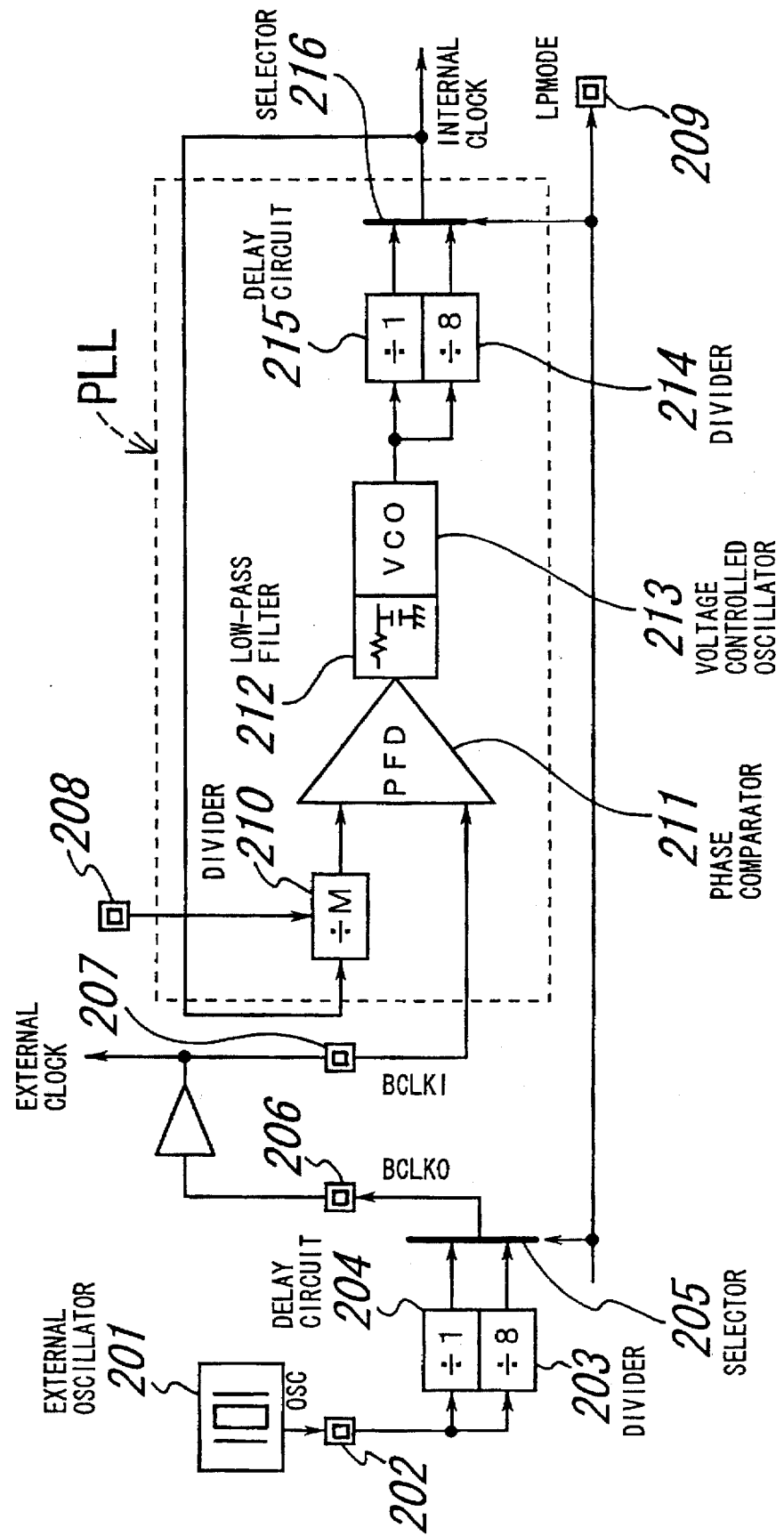
FIG. 2 is a block diagram showing a detailed construction of the clock generator-controller built in the microprocessor of FIG. 1.

FIG. 2 shows in block diagram a detailed construction of the clock generator-controller 103 shown in FIG. 1.

Referring to FIG. 2, the clock generator-controller 103 shown includes an input terminal 202 for receiving an oscillation output generated by an external oscillator 201, a first divider 203 for dividing the oscillation signal received from the outside to produce an oscillation signal of a low frequency, a delay circuit 204 for delaying the oscillation signal received from the outside by a delay time equal to that of the oscillation signal divided by the first divider 203, a selector 205 for selectively outputting one of the low frequency oscillation signal divided by the first divider 203 and the oscillation signal delayed by the delay circuit 204 in response to a current operation condition, a signal output terminal 206 for supplying the output of the selector 205 as an external system clock signal, a signal input terminal 207 for receiving an external system clock signal produced in response to the external system clock output, an input terminal 208 for receiving a signal (dividing signal) which designates a ratio between the external system clock signal and an internal clock signal, a second divider 210 for dividing the internal clock signal at a ratio designated by the signal which designates the ratio of the external system clock signal and the internal clock signal, a phase comparator 211 for comparing the phases of the clock signal divided by the second divider 210 which divides the internal clock signal and the external system clock signal with each other, a low-pass filter 212 for converting a result of the comparison of the phase comparator 211 into an analog voltage, a voltage controlled oscillator (VCO) 213 for varying the oscillation frequency thereof in response to the output of the low-pass filter 212, a third divider 214 for dividing the oscillation signal produced by the voltage controlled oscillator 213 to produce an oscillation signal of a low frequency, a second delay circuit 215 for delaying the oscillation signal produced by the voltage controlled oscillator 213 by a delay time equal to that of the oscillation signal divided by the third divider 214, and a second selector 216 for selectively outputting one of the low frequency oscillation signal divided by the third divider 214 and the oscillation signal delayed by the second delay circuit 215 in response to a designation of a low power dissipation operation.

The internal clock signal outputted from the second selector 216 is fed back as an input clock signal to the second divider 210. Consequently, a phase locked loop circuit PLL is formed from the second divider 210, phase comparator 211, low-pass filter 212, voltage controlled oscillator 213, third divider 214, second delay circuit 215 and second selector 216.

In the clock generator-controller 103 of the circuit construction described above, an oscillation signal generated by the external oscillator 201 is supplied by way of the oscillation signal input terminal 202 to the first divider 203 and the delay circuit 204. The outputs of the first divider 203 and the delay circuit 204 are switched by the selector 205 in response to a signal (operation condition signal) 209 which designates a low power dissipation operation so that one of them is outputted from the selector 205 and is supplied to an external system by way of the signal output terminal 206 for a system clock signal. In this instance, the first divider 203 and the delay circuit 204 are included in the microprocessor, and consequently, the difference between the delay times of the first divider 203 and the delay circuit 204 can be supplied substantially to zero by managing the circuit configuration and so forth severely so that production of a spike upon switching of the selector outputs can be suppressed.

The external system drives, when necessary, a signal supplied thereto by way of the signal output terminal 206 for an external system clock signal and uses the signal as an external system clock signal. The signal driven by the external system and used actually as an external system clock signal is received by way of the external system clock signal input terminal 207. The phase locked loop circuit PLL formed from the phase comparator 211, low-pass filter 212, voltage controlled oscillator 213, third divider 214, delay circuit 215, selector 216 and second divider 210 functions based on an operation principle of a frequency phase locked loop and synchronizes the phase and the frequency of the output signal of the voltage controlled oscillator 213 with the phase and the frequency of the external system clock signal received by way of the external system clock signal input terminal 207. In this instance, while the delay time difference (skew) between the signal supplied from the signal output terminal 206 for an external system clock signal and the external system clock system is varied by the driver connected to the signal output terminal 206 for an external system clock signal, since the frequency phase locked loop circuit synchronizes the frequency and the phase of the actual external system clock signal received by way of the external system clock signal input terminal 207 and the frequency and the phase of the internal clock signal with each other, the time difference between the external system clock signal and the internal clock signal is always kept fixed. In short, the time difference (skew) can be supplied substantially to zero.

The phase comparator 211 compares the phase of the external system clock signal (frequency: fext) with the phase of the output signal (frequency: fint/M) of the divider 210 and generates an output signal which increases in proportion to the difference in phase between the two signals. The output signal is applied to the input terminal of the low-pass filter 212. The low-pass filter 212 shapes the output signal of the phase comparator 211 and applies an output signal thereof to the frequency control input terminal of the voltage controlled oscillator 213. The voltage controlled oscillator 213 generates an output signal having a frequency related directly to the value of the voltage VIN applied to the frequency control input terminal and given by $$fint = K \times VIN$$

where K is a constant determined based on a particular circuit parameter.

The output signal of the voltage controlled oscillator 213 is supplied to the divider 214 (dividing ratio: 8) and the voltage controlled oscillator 213. The outputs of the divider 214 and the delay circuit 215 are switched by the second selector 216 in response to the signal 209 which designates a low power dissipation operation, and the thus selected output is supplied to the calculation apparatus or central processing unit 102. The relationship between the power dissipation Pslow of the calculation apparatus 102 when it operates with a clock signal of a low frequency and the power dissipation Pnormal when the calculation apparatus 102 operates with a clock signal which has not been divided is given by the following equation (1):

$$Pnormal = 8 \times Pslow \qquad (1)$$

The output signal of the selector 216 is supplied to the divider 210 which divides the frequency of the input signal thereto with a dividing coefficient M. The frequency finit of the output signal of the selector 216 is related to the frequency fext of the external system clock signal by the following equation:

$$fint = M \times fext$$

where M is the dividing coefficient of the divider 210 and is determined by the control signal applied to the input terminal 208.

Referring now to FIG. 8, there is shown in block diagram a detailed construction of a clock generator-controller employed in another microprocessor with a built-in clock generator-controller to which the present invention is applied. The microprocessor has a same basic construction as that of the microprocessor described hereinabove with reference to FIG. 1, and only the construction of the clock generator-controller is shown in FIG. 8 similarly to FIG. 2.

Figure 3:
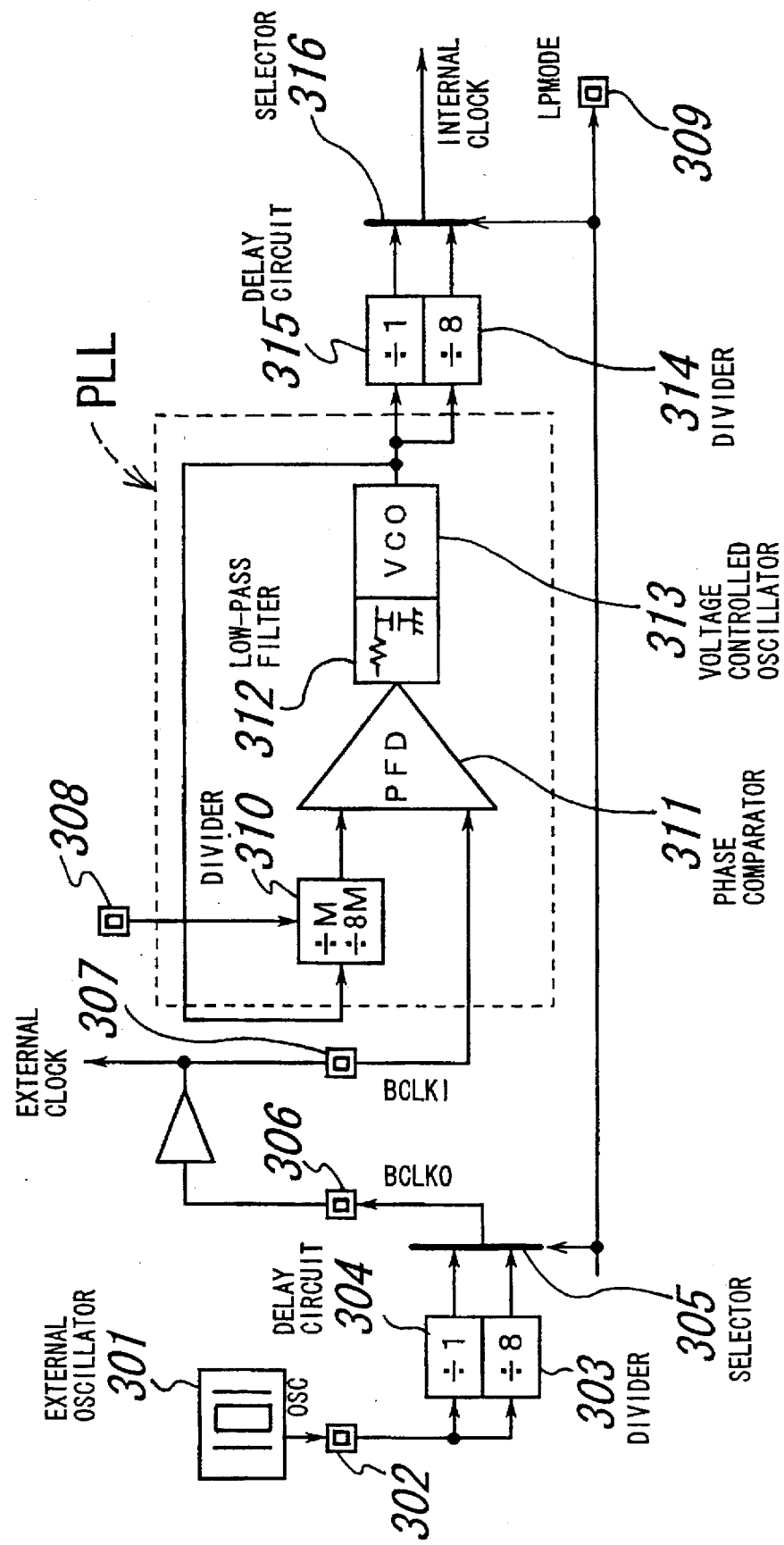
FIG. 3 is a block diagram showing a detailed construction of a clock generator-controller built in another microprocessor to which the present invention is applied.
Figure 4:
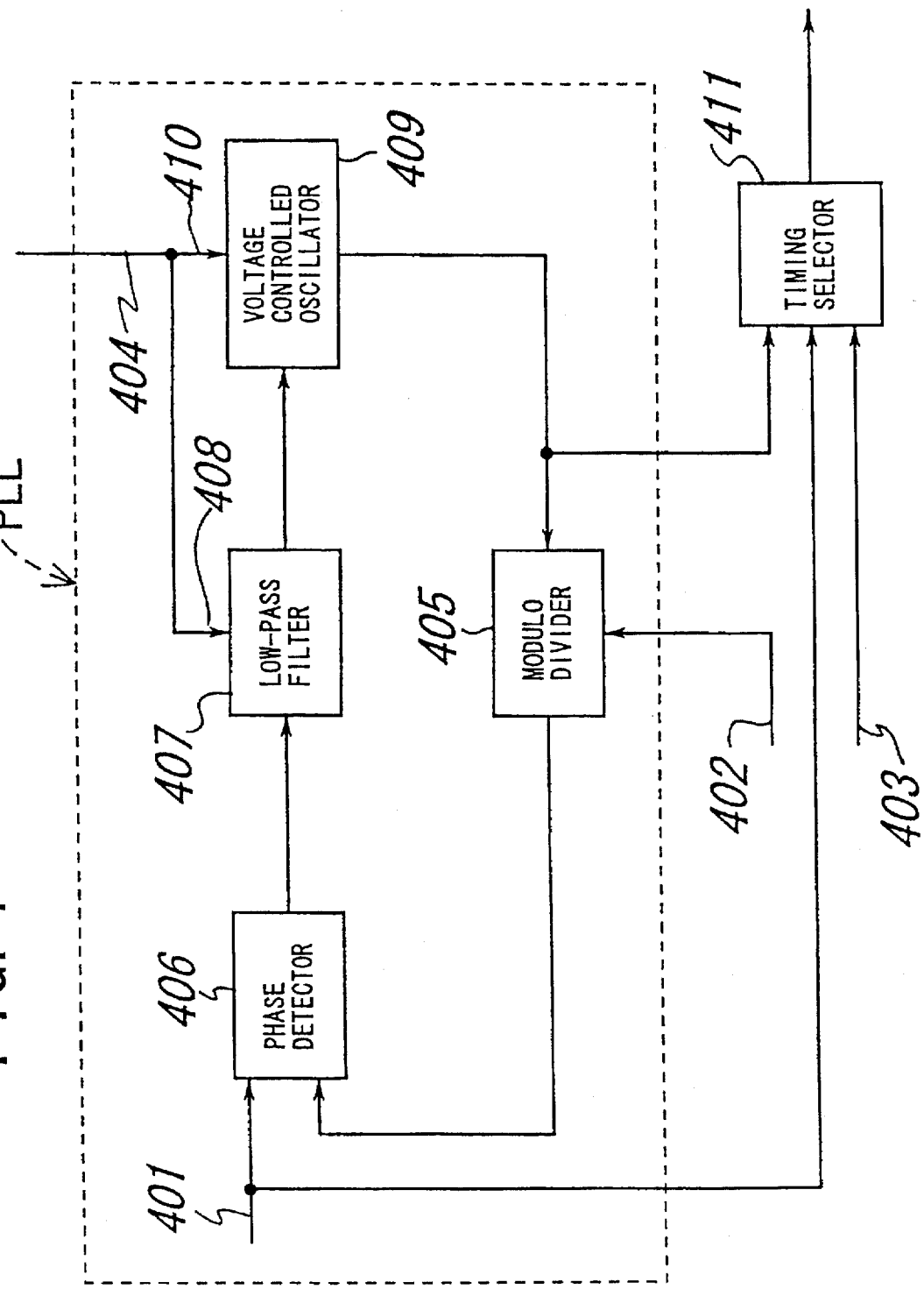
FIG. 4 is a block diagram showing a construction of a conventional clock controller for a microprocessor which can operate with low power dissipation.
Figure 5:
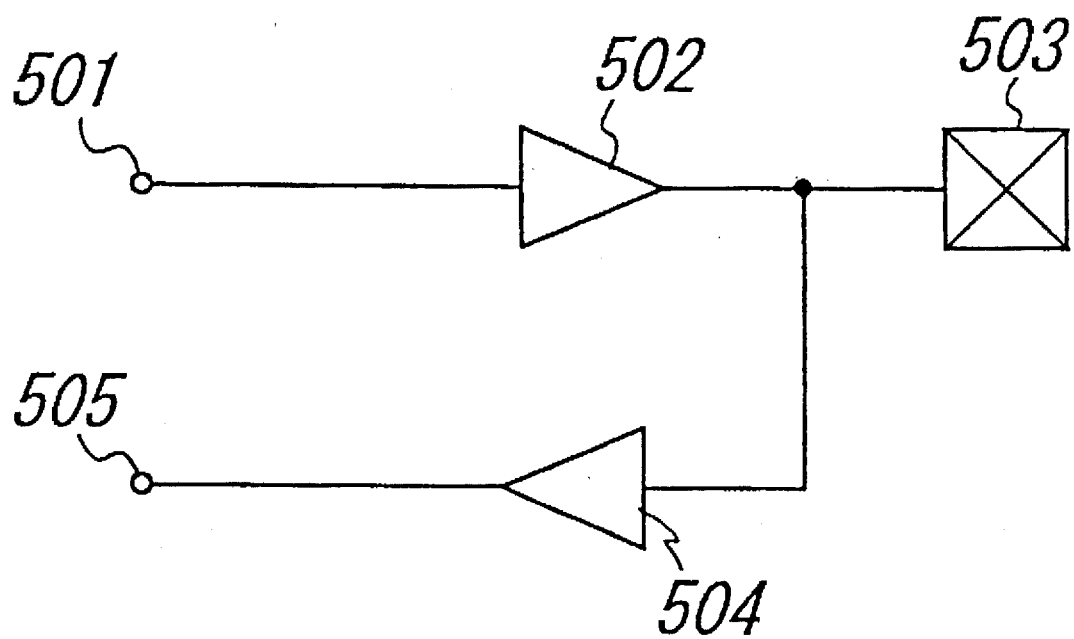
FIG. 5 is a circuit diagram showing a construction of a conventional clock outputting circuit.

The clock generator-controller shown in FIG. 3 includes an input terminal 302 for receiving an oscillation output produced by an external oscillator 301, a first divider 303 for dividing the oscillation signal received from the outside to produce an oscillation signal of a low frequency, a delay circuit 304 for delaying the oscillation signal received from the outside by a delay time equal to that of the oscillation signal divided by the first divider 303, a selector 305 for selectively outputting one of the low frequency oscillation signal divided by the first divider 303 and the oscillation signal delayed by the delay circuit 304 in response to a designation of a low power dissipation operation, a signal output terminal 306 for supplying the output of the selector 305 as an external system clock signal, a signal input terminal 307 for receiving an external system clock signal produced in response to the external system clock output, an input terminal 308 for receiving a signal which designates a ratio between the external system clock signal and an internal clock signal, a second divider 310 for dividing the internal clock signal in response to the ratio designated by the signal which designates the external system clock signal and the internal clock signal and the designation of a low power dissipation operation, a phase comparator 311 for comparing the phases of the clock signal divided by the second divider 310 which divides the internal clock signal and the external system clock signal with each other, a low-pass filter 312 for converting a result of the comparison of the phase comparator 311 into an analog voltage, a voltage controlled oscillator (VCO) 313 for producing an oscillation signal having an oscillation frequency which varies in response to the output of the low-pass filter 312, a third divider 314 for dividing the oscillation signal produced by the voltage controlled oscillator 313 to produce an oscillation signal of a low frequency, a second delay circuit 315 for delaying the oscillation signal produced by the voltage controlled oscillator 313 by a delay time equal to that of the oscillation signal divided by the third divider 314, and a second selector 316 for selectively outputting one of the low frequency oscillation signal divided by the third divider 314 and the oscillation signal delayed by the second delay circuit 315 in response to the designation of a low power dissipation operation. It is to be noted that reference numeral 309 denotes a signal (operation condition signal) which designates a low power dissipation operation.

In the clock generator-controller of FIG. 3, the output of the voltage controlled oscillator 313 is fed back as an input clock signal to the second divider 310. Consequently, a phase locked loop circuit PLL is formed from the second divider 310, phase comparator 311, low-pass filter 312 and voltage controlled oscillator 313 except the third divider 314, second delay circuit 315 and second selector 316. The phase locked loop circuit PLL formed in this manner functions based on an operation principle of a frequency phase locked loop and synchronizes the phase and the frequency of the output signal of the voltage controlled oscillator 313 with the phase and the frequency of an external system clock signal received by way of the external system clock signal input terminal 307. Since the divider 314, delay circuit 315 and selector 316 are excluded from the phase locked loop circuit PLL, the clock generator-controller can cope with a higher internal frequency.

While, in both of the microprocessors of the first and second embodiments described above, the dividing ratios of the third dividers 214 and 314 are 8, an arbitrary dividing ratio N can naturally be adopted in accordance with a requirement of a system. In this instance, the relationship given by the equation (1) above between the power dissipation Pslow of the calculation apparatus which operates with a clock signal of a low frequency and the power dissipation Pnormal when the calculation apparatus operates with a clock signal which has not been divided is given by $$Pnormal = N \times Pslow$$

Further, while, in the embodiments described above, the present invention is applied to a microcomputer with a built-in clock generator-controller, naturally the present invention can be applied to all LSIs which operate in synchronism with a clock signal.

Having now fully described the invention, it will be apparent to one of ordinary skill in the art that many changes and modifications can be made thereto without departing from the spirit and scope of the invention as set forth herein.

What is claimed is:

1. A large scale integrated circuit with a built-in clock generator-controller, comprising:

a central processing unit for outputting an operation condition signal indicative of whether a current operation condition thereof is a low power dissipation operation or a normal operation; and a clock generator-controller for receiving the operation condition signal, an output of an external oscillator, an external system clock signal, and a dividing signal which designates a ratio between the external system clock signal and an internal clock signal, and for producing an internal clock signal in response to the operation condition indicated by the operation condition signal and supplying the internal clock signal to said central processing unit;

said clock generator-controller including a first input terminal for receiving an oscillation signal generated by the external oscillator, a first divider for dividing the oscillation signal to produce an oscillation signal of a low frequency, first delay means for delaying the oscillation signal received from the outside by a delay time equal to that of the oscillation signal divided by said first divider, first switching means for selectively outputting one of the low frequency oscillation signals divided by said first divider and the oscillation signal delayed by said first delay means in response to the operation condition signal from said central processing unit, an output terminal for supplying the output of said first switching means as a basic signal for the external system clock signal, a second input terminal for receiving the external system clock signal, a third input terminal for receiving the dividing signal, a second divider for dividing the internal clock signal in response to the dividing signal, a phase comparator for comparing phases of the clock signal divided by said second divider and the external system clock signal with each other, a low-pass filter for converting a result of the comparison of said phase comparator into an analog voltage, a voltage controlled oscillator for outputting an oscillation signal having an oscillation frequency which is varied in response to the output signal of said low-pass filter, a third divider for dividing the oscillation signal produced by said voltage controlled oscillator to produce an oscillation signal of a low frequency, second delay means for delaying the oscillation signal produced by said voltage controlled oscillator by a delay time equal to that of the oscillation signal divided by said third divider, and second switching means for selectively outputting, as the internal clock signal, one of the low frequency oscillation signals divided by the said third divider and the oscillation signal delayed by said second delay means in response to the operation condition signal from said central processing unit;

the internal clock signal outputted from said second switching means being fed back as an input clock signal to said second divider so that a phase locked loop circuit is formed by said second divider, said phase comparator, said low-pass filter, said voltage controlled oscillator, said third divider, said second delay means and said second switching means.

2. A large scale integrated circuit with a built-in clock generator-controller, comprising:

a central processing unit for outputting an operation condition signal indicative of whether a current operation condition thereof is a low power dissipation operation or a normal operation; and a clock generator-controller for receiving the operation condition signal, an output of an external oscillator, an external system clock signal, and a dividing signal which designates a ratio between the external system clock signal and an internal clock signal, producing an internal clock signal in response to the operation condition indicated by the operation condition signal and supplying the internal clock signal to said central processing unit;

said clock generator-controller including a first input terminal for receiving an oscillation signal produced by said external oscillator, a first divider for dividing the oscillation signal to produce an oscillation signal of a low frequency, first delay means for delaying the oscillation signal received from the outside by a delay time equal to that of the oscillation signal divided by said first divider, first switching means for selectively outputting one of the low frequency oscillation signal divided by said first divider and the oscillation signal delayed by said first delay means in response to the operation condition signal from said central processing unit, an output terminal for supplying the output of said first switching means as a basic signal for the external system clock signal, a second input terminal for receiving an external system clock signal produced in response to the external system clock output, a third input terminal for receiving the dividing signal, a second divider for dividing the internal clock signal in response to the dividing signal and the operation condition signal, a phase comparator for comparing phases of the clock signal divided by said second divider and the external system clock signal with each other other, a low-pass filter for converting a result of the comparison of said phase comparator into an analog voltage, a voltage controlled oscillator for producing an oscillation signal having an oscillation frequency which is varied in response to the output of said low-pass filter, a third divider for dividing the oscillation signal produced by said voltage controlled oscillator to produce an oscillation signal of a low frequency, second delay means for delaying the oscillation signal produced by said voltage controlled oscillator by a delay time equal to that of the oscillation signal divided by said third divider, and second switching means for selectively outputting, as the internal clock signal, one of the low frequency oscillation signals divided by said third divider and the oscillation signal delayed by said second delay means in response to the operation condition signal from said central processing unit;

the output of said voltage controlled oscillator being fed back as an input clock signal to said second divider so that a phase locked loop circuit is formed from said second divider, said phase comparator, said low-pass filter and said voltage controlled oscillator.

3. A large scale integrated circuit with a built-in clock generator-controller, comprising:

a central processing unit for outputting an operation condition signal indicative of whether a current operation condition thereof is a low power dissipation operation or a normal operation; and a clock generator-controller for receiving the operation condition signal, an output of an external oscillator, an external system clock signal, and a dividing signal which designates a ratio between the external system clock signal and an internal clock signal, and for producing an internal clock signal in response to the operation condition indicated by the operation condition signal and supplying the internal clock signal to said central processing unit;

said clock generator-controller receiving an oscillation signal generated by the external oscillator and including a first divider for dividing the oscillation signal to produce an oscillation signal of a low frequency, a first delay circuit for delaying the oscillation signal received from the outside by a delay time equal to that of the oscillation signal divided by said first divider, a first switch for selectively outputting one of the low frequency oscillation signals divided by said first divider and the oscillation signal delayed by said first delay circuit in response to the operation condition signal from said central processing unit, the output of said first switch being a basic signal for the external system clock signal, a second divider for dividing the internal clock signal in response to the dividing signal, a phase comparator for comparing phases of the clock signal divided by said second divider and the external system clock signal with each other, a low-pass filter for converting a result of the comparison of said phase comparator into an analog voltage, a voltage controlled oscillator for outputting an oscillation signal having an oscillation frequency which is varied in response to the output signal of said low-pass filter, a third divider for dividing the oscillation signal produced by said voltage controlled oscillator to produce an oscillation signal of a low frequency, a second delay circuit for delaying the oscillation signal produced by said voltage controlled oscillator by a delay time equal to that of the oscillation signal divided by said third divider, and a second switch for selectively outputting, as the internal clock signal, one of the low frequency oscillation signals divided by the said third divider and the oscillation signal delayed by said second delay circuit in response to the operation condition signal from said central processing unit;

the internal clock signal outputted from said second switch being fed back as an input clock signal to said second divider so that a phase locked loop circuit is formed by said second divider, said phase comparator, said low-pass filter, said voltage controlled oscillator, said third divider, said second delay circuit and said second switch.

4. A large scale integrated circuit with a built-in clock generator-controller, comprising:

a central processing unit for outputting an operation condition signal indicative of whether a current operation condition thereof is a low power dissipation operation or a normal operation; and a clock generator-controller for receiving the operation condition signal, an output of an external oscillator, an external system clock signal, and a dividing signal which designates a ratio between the external system clock signal and an internal clock signal, and for producing an internal clock signal in response to the operation condition indicated by the operation condition signal and supplying the internal clock signal to said central processing unit;

said clock generator-controller for receiving an oscillation signal produced by said external oscillator and including a first divider for dividing the oscillation signal to produce an oscillation signal of a low frequency, a first delay circuit for delaying the oscillation signal received from the outside by a delay time equal to that of the oscillation signal divided by said first divider, a first switch for selectively outputting one of the low frequency oscillation signals divided by said first divider and the oscillation signal delayed by said first delay circuit in response to the operation condition signal from said central processing unit, the output of said first switch being a basic signal for the external system clock signal, a second divider for dividing the internal clock signal in response to the dividing signal and the operation condition signal, a phase comparator for comparing phases of the clock signal divided by said second divider and the external system clock signal with each other other, a low-pass filter for converting a result of the comparison of said phase comparator into an analog voltage, a voltage controlled oscillator for producing an oscillation signal having an oscillation frequency which is varied in response to the output of said low-pass filter, a third divider for dividing the oscillation signal produced by said voltage controlled oscillator to produce an oscillation signal of a low frequency, a second delay circuit for delaying the oscillation signal produced by said voltage controlled oscillator by a delay time equal to that of the oscillation signal divided by said third divider, and a second switch for selectively outputting, as the internal clock signal, one of the low frequency oscillation signals divided by said third divider and the oscillation signal delayed by said second delay circuit in response to the operation condition signal from said central processing unit;

the output of said voltage controlled oscillator being fed back as an input clock signal to said second divider so that a phase locked loop circuit is formed from said second divider, said phase comparator, said low-pass filter and said voltage controlled oscillator.

* * * * *